US012420252B2

(12) United States Patent
Zhang et al.

(10) Patent No.: US 12,420,252 B2
(45) Date of Patent: Sep. 23, 2025

(54) POWDER COATING DEVICE AND COATING METHOD, POWDER DISPERSION DEVICE, AND POWDER DISPERSION METHOD

(71) Applicant: KAWATA MFG. CO., LTD., Osaka (JP)

(72) Inventors: Chunxiao Zhang, Osaka (JP); Keisuke Tominaga, Osaka (JP); Haruhisa Hirokawa, Osaka (JP)

(73) Assignee: KAWATA MFG. CO., LTD. (JP)

( * ) Notice: Subject to any disclaimer, the term of this patent is extended or adjusted under 35 U.S.C. 154(b) by 149 days.

(21) Appl. No.: 17/863,105

(22) Filed: Jul. 12, 2022

(65) Prior Publication Data

US 2022/0347642 A1    Nov. 3, 2022

Related U.S. Application Data

(62) Division of application No. 17/434,999, filed as application No. PCT/JP2019/030268 on Aug. 1, 2019.

(30) Foreign Application Priority Data

Mar. 1, 2019   (JP) ................................. 2019-038048

(51) Int. Cl.
*B01J 2/00*        (2006.01)
*B01J 2/04*        (2006.01)
(Continued)

(52) U.S. Cl.
CPC ............... *B01J 2/006* (2013.01); *B01J 2/003* (2013.01); *B01J 2/04* (2013.01); *B01J 2/30* (2013.01); *B05C 3/02* (2013.01)

(58) Field of Classification Search
CPC .............. B01J 2/003; B01J 2/006; B01J 2/04
See application file for complete search history.

(56) References Cited

U.S. PATENT DOCUMENTS 5,075,138 A    12/1991 Tanaka et al.
5,230,735 A *  7/1993 Murata .................... B01J 2/006
                                               118/62
(Continued)

FOREIGN PATENT DOCUMENTS

JP    2-107366 A    4/1990
JP    5-208127 A    8/1993
(Continued)

OTHER PUBLICATIONS

International Search Report of PCT/JP2019/030268, Oct. 15, 2019, 4 pages.

*Primary Examiner* — Michael P Wieczorek
(74) *Attorney, Agent, or Firm* — FROST BROWN TODD LLP

(57) ABSTRACT

This coating device 1 comprises a dispersing/mixing part 2, a conveying part 3, and a collecting part 4. A raw material powder and a coating solution are supplied to the dispersing/mixing part 4 as a slurry. In the dispersing/mixing part 2, the slurry (mixture) in which the raw powder and the coating solution have been mixed is dispersed by means of an air flow of a high-pressure fluid into a powder, a film of the coating solution having adhered to the surface of the powder. The powder is introduced from the dispersing/mixing part 2 to the conveying part 3t and is conveyed with the conveying part 3 oriented toward the collecting part 4. While the powder is being conveyed, the coating solution that has adhered to the particle surfaces dries, whereby a powder in which the particle surfaces areas coated with a precursor is produced. A powder flow introduced into the collecting part 4 passes through a bag filter 54. This causes the powder to be captured by the bag filter 54.

13 Claims, 12 Drawing Sheets

(51) Int. Cl.
 B01J 2/30 (2006.01)
 B05C 3/02 (2006.01)

(56) References Cited

U.S. PATENT DOCUMENTS

| | | | |
|---|---|---|---|
| 2010/0069701 A1* | 3/2010 | Turok | B01J 2/04 |
| | | | 425/6 |
| 2013/0056556 A1 | 3/2013 | Schmon et al. | |
| 2019/0051904 A1* | 2/2019 | Zhamu | H01M 10/058 |

FOREIGN PATENT DOCUMENTS

| | | |
|---|---|---|
| JP | 2003-93865 A | 4/2003 |
| JP | 2003-183022 A | 7/2003 |
| JP | 2011-56348 A | 3/2011 |
| JP | 2013-537470 A | 10/2013 |

* cited by examiner

| UNIT NUMBER | TOTAL JETTING AMOUNT FROM THE JET PORT (L/min(normal)) | ASSIST AIR AMOUNT (L/min(normal)) | AIR AMOUNT IN THE CYLINDRICAL PORTION (L/min(normal)) |
|---|---|---|---|
| 1 | 100 | 60 | 160 |
| 2 | 200 | 120 | 320 |
| 3 | 300 | 180 | 480 |
| 4 | 400 | 240 | 640 |

FIG. 11

POWDER COATING DEVICE AND COATING METHOD, POWDER DISPERSION DEVICE, AND POWDER DISPERSION METHOD

CROSS-REFERENCE TO RELATED APPLICATION

This application is a divisional application of, and claims priority to and the benefit of U.S. patent application Ser. No. 17/434,999, filed Aug. 30, 2021, which is a U.S. National Phase Patent Application of International Application Number PCT/JP2019/030268, filed on Aug. 1, 2019, which claims priority of Japanese Patent Application Number 2019-038048, filed on Mar. 1, 2019, the entire content of each of which is incorporated herein by reference.

TECHNICAL FIELD

The present invention relates to a coating apparatus and a coating method of a powder, a powder dispersion device, and a powder dispersion method.

BACKGROUND ART

In a technique of surface modification and composition formation, a powder can be provided with various functionalities by bonding fine particles to different particles and coating surfaces of the particles with the fine particles. The technique of surface modification and composition formation is actively used in the fields of foods, pharmaceutical products, cosmetics, and the like and is also used for materials used in electronic parts and batteries to improve electrical characteristics.

As a method of powder coating, there is a method of forming a coating layer of a fine powder that is a coating material on a surface of a raw material powder (particles) that is a main raw material by attaching a coating solution, obtained by dispersing the fine powder in a solvent, to the raw material powder and drying the attached coating solution.

For example, Patent Literature 1 discloses an apparatus that performs a coating process of forming a coating layer on a raw material powder by introducing a fluidized gas into a container containing the raw material powder and jetting a coating solution to the fluidized raw material powder by using the fluidized gas. In such an apparatus, if jetting speed in misting and attachment of the coating solution in the coating process is high, the powder is agglomerated due to liquid bridge force. Accordingly, the coating sometimes takes time. Moreover, since the coating process is a batch process, the whole process also takes long time.

Meanwhile, Patent Literature 2 discloses an apparatus that: causes air to swirl in a cyclone-shaped container while causing a powder and a spray of a coating solution to mix into the swirling gas flow: forms a coating layer on the powder in a conveyance path subsequent to the container; and collects the powder subjected to the coating process.

CITATION LISTS

Patent Literatures

Patent Literature 1: Japanese Patent Application Publication No. 2011-56348
Patent Literature 2: Japanese Patent Application Publication No. Hei 2-107366

SUMMARY OF INVENTION

Technical Problem

A trend of a decrease in the size of particles of the raw material powder is still continuing and the agglomeration property of the raw material powder becomes higher with the decrease in the size of particles. Accordingly, an apparatus that performs the coating process is desired to have higher dispersibility. Moreover, the apparatuses according to the prior techniques all have a problem of requiring considerable time to form an even coating layer on the surface of the raw material powder while maintaining a state where the raw material powder is not agglomerated. Moreover, occurrence of collection loss due to attachment of the powder around a spray nozzle that jets out the coating solution is also a problem in production.

An object of the present invention is to provide a coating apparatus and a coating method of a powder, a powder dispersion device, and a powder dispersion method that can improve dispersibility of the powder and efficiency of a coating process.

Solution to Problem

In order to achieve the aforementioned object, a coating apparatus of a powder according to one aspect of the present invention comprises: a dispersion unit that disperses a mixture of a raw material powder and a coating solution containing a coating material by using a gas flow of high-pressure fluid while causing a film of the coating solution to attach to a surface of the raw material powder; a conveyance unit that conveys the raw material powder which flows into the conveyance unit from the dispersion unit and to which the film of the coating solution is attached by causing a gas flow to carry the raw material powder and that dries the coating solution during the conveyance; and a collection unit that collects a composite powder produced by drying the coating solution in the conveyance unit.

According to this configuration, in the dispersion unit, the mixture of the raw material powder and the coating solution is dispersed by using the gas flow of high-pressure fluid such as, for example, a supersonic air and turned into the powder in which the film of the coating solution is attached to the surface of the raw material powder. Accordingly, it is possible to suppress agglomeration of the powder and improve the dispersibility. The coating process on the powder can be thus performed in a continuous process. Moreover, since the dispersion unit includes no spray nozzle that jets out the coating solution, there is no collection loss caused by attachment of the powder around the spray nozzle and the efficiency of the coating process (powder collection efficiency) can be improved.

Moreover, introducing the mixture in the slurry state into the dispersion unit can improve the attachment ratio of the coating material to the particles that are the main raw material.

The high-pressure fluid is preferably heated to predetermined temperature in advance.

This configuration can suppress a temperature drop due to adiabatic expansion that occurs in the jetting of the high-pressure fluid and enables efficient drying without a decrease in drying speed.

The dispersion unit may be configured to include a flow path through which the mixture flows and a first jet port and a second jet port that each blow out the gas flow of high-pressure fluid toward a collision position.

This configuration can cause the mixture flowing through the flow path to receive shear force from the gas flows colliding at the collision position when passing the collision position and be preferably dispersed and turned into the powder.

A maximum Mach number of the gas flows from the first jet port and the second jet port is preferably 1 or more. In other words, the flow rate of the gas flows from the first jet port and the second jet port is preferably equal to or higher than the speed of sound.

This allows large shear force generated by the supersonic gas flows to be applied to the mixture and can preferably suppress agglomeration of the powder and further improve the dispersibility.

The coating apparatus may have a configuration in which the flow path, the first jet port, and the second jet port are formed such that center lines of a flow of the mixture toward the collision position and the gas flows from the first jet port and the second jet port are located on the same plane, and a plurality of the flow paths are provided to be aligned in a direction orthogonal to the center lines.

This can increase the processing amount of the coating apparatus per unit time.

Moreover, the dispersion unit may be configured to include a flow path, a gas flow introduction port that introduces the gas flow of high-pressure fluid into the flow path, and a mixture introduction port that is provided downstream of the gas flow introduction port in a flow direction of the gas flow and that introduces the mixture into the flow path.

According to this configuration, the mixture can be preferably dispersed and turned into the powder by receiving shear force from the gas flow in the flow path.

Moreover, in this configuration, the flow path may have a Laval nozzle form that extends downstream in the flow direction from the gas flow introduction port and that has a narrow middle portion.

This configuration can accelerate the gas flow introduced into the flow path from the gas flow introduction port by causing the gas flow to pass the narrow middle portion.

The mixture introduction port is preferably located downstream of the narrow middle portion of the flow path in the flow direction.

Large shear force can be thereby applied from the gas flow to the mixture.

The maximum Mach number of the gas flow at the moment when the gas flow passes the mixture introduction port is preferably 1 or more. In other words, the flow rate of the gas flow at the moment when the gas flow passes the mixture introduction port is preferably equal to or higher than the speed of sound.

This allows large shear force generated by the supersonic gas flows to be applied to the mixture and can preferably suppress agglomeration of the powder and further improve the dispersibility.

The coating apparatus may be configured to further include a gas introduction unit that introduces a heated dry gas into the conveyance unit. The temperature of the heated dry gas is within a range of room temperature to 300° C., may be within a range of 40° C. to 300° C., and is preferably within a range of 60° C. to 200° C. depending on a temperature characteristic of a solvent of the coating material.

This can promote the drying of the coating solution in the conveyance unit.

The coating apparatus may have a configuration in which the conveyance unit has a cylindrical inner peripheral surface and the gas introduction unit introduces the heated dry gas into the conveyance unit such that the heated dry gas flows along the inner peripheral surface.

This configuration can suppress attachment of the powder to the inner peripheral surface of the conveyance unit and further improve the powder collection efficiency.

The coating apparatus may have a configuration in which the conveyance unit includes an introduction path that introduces the powder from the dispersion unit and the gas introduction unit introduces the heated dry gas into the conveyance unit from a position facing a pipe wall forming the introduction path.

This configuration can suppress collision between the flow of the powder introduced from the dispersion unit to the conveyance unit and the heated dry gas introduced from the gas introduction unit to the conveyance unit in directions orthogonal to each other and suppress generation of turbulence in the conveyance unit. As a result, it is possible to suppress attachment of the powder around the gas introduction unit on an inner surface of the conveyance unit and further improve the powder collection efficiency.

The dispersion unit, the conveyance unit, and the collection unit are preferably arranged to be linearly aligned.

This allows the powder to be promptly conveyed and can increase the speed of the coating process.

The dispersion unit may be configured to cause the mixture to flow toward the conveyance unit in an up-down direction.

This configuration allows gravity acting on the mixture to be used for flowing of the mixture and can reduce energy required to pressure-feed the mixture. Moreover, the mixture can be prevented from unevenly distributed in the gravity direction and be evenly dispersed.

A coating method of a powder according to another aspect of the present invention is a method comprising: dispersing a mixture of a raw material powder and a coating solution containing a coating material by using a gas flow of high-pressure fluid while causing a film of the coating solution to attach to a surface of the raw material powder; conveying the raw material powder to which the film of the coating solution is attached by causing a gas flow to carry the raw material powder and drying the coating solution during the conveyance; and collecting a composite powder produced by drying the coating solution.

This method can provide operations and effects similar to the operations and effects provided by the aforementioned coating apparatus.

A powder dispersion device according to yet another aspect of the present invention comprises: a flow path through which a slurry produced in advance by mixing a raw material powder and a coating solution containing a coating material flows; and a jet port that blows out a gas flow of high-pressure fluid toward a collision position, wherein when the slurry flowing through the flow path passes the collision position, shear force generated by the gas flow is applied to the slurry to disperse the slurry and turn the slurry into the raw material powder in which a film of the coating solution is attached to a surface.

According to this configuration, the slurry containing the raw material powder and the coating solution can be preferably dispersed by using the shear force received from the gas flow such as, for example, a supersonic air, and turned into the raw material powder in which the film of the coating solution is attached to the surface. Thus, it is possible to suppress agglomeration of the powder and improve the dispersibility. Moreover, since the dispersion unit includes no spray nozzle that jets out the coating solution, there is no collection loss caused by attachment of the powder around the spray nozzle and the efficiency of the coating process (powder collection efficiency) can be improved. Furthermore, introducing the mixture in the slurry state can improve the attachment ratio of the coating material to the particles that are the main raw material.

A powder dispersion method corresponding to the aforementioned powder dispersion device is a method comprising: causing a slurry produced in advance by mixing a raw material powder and a coating solution containing a coating material to flow through a flow path; blowing out a gas flow of high-pressure fluid from a jet port toward a collision position; and when the slurry flowing through the flow path passes the collision position, applying shear force generated by the gas flow to the slurry to disperse the slurry and turn the slurry into the raw material powder in which a film of the coating solution is attached to a surface.

This method can provide operations and effects similar to the operations and effects of the corresponding powder dispersion device.

A powder dispersion device according to still another aspect of the present invention comprises: a flow path; a gas flow introduction port that introduces a gas flow of high-pressure fluid into the flow path; and a slurry introduction port that is provided downstream of the gas flow introduction port in a flow direction of the gas flow and that introduces a slurry, produced in advance by mixing a raw material powder and a coating solution containing a coating material, into the flow path, wherein shear force generated by the gas flow is applied to the slurry in the flow path to disperse the slurry and turn the slurry into the raw material powder in which a film of the coating solution is attached to a surface.

According to this configuration, the slurry containing the raw material powder and the coating solution can be preferably dispersed by using the shear force received from the gas flow such as, for example, a supersonic air, and turned into the raw material powder in which the film of the coating solution is attached to the surface. Thus, it is possible to suppress agglomeration of the powder and improve the dispersibility. Moreover, since the dispersion unit includes no spray nozzle that jets out the coating solution, there is no collection loss caused by attachment of the powder around the spray nozzle and the efficiency of the coating process (powder collection efficiency) can be improved. Furthermore, introducing the mixture in the slurry state can improve the attachment ratio of the coating material to the particles that are the main raw material.

A powder dispersion method corresponding to the aforementioned powder dispersion device is a method comprising: introducing a gas flow of high-pressure fluid into a flow path from a gas flow introduction port; introducing a slurry, produced in advance by mixing a raw material powder and a coating solution containing a coating material, into the flow path from a slurry introduction port provided downstream of the gas flow introduction port in a flow direction of the gas flow; and applying shear force generated by the gas flow to the slurry in the flow path to disperse the slurry and turn the slurry into the raw material powder in which a film of the coating solution is attached to a surface.

This method can provide operations and effects similar to the operations and effects of the corresponding powder dispersion device.

Advantageous Effects of Invention

The present invention can improve the dispersibility of the powder and the efficiency of the coating process.

BRIEF DESCRIPTION OF DRAWINGS

FIG. 11 is a table illustrating relationships between the number of units included in the dispersion mixing unit and each of a total jetting amount, an assist air amount, and an air amount in a cylindrical portion.

DESCRIPTION OF EMBODIMENTS

Embodiments of the present invention are described below in detail with reference to the attached drawings.

First Embodiment

Figure 1:
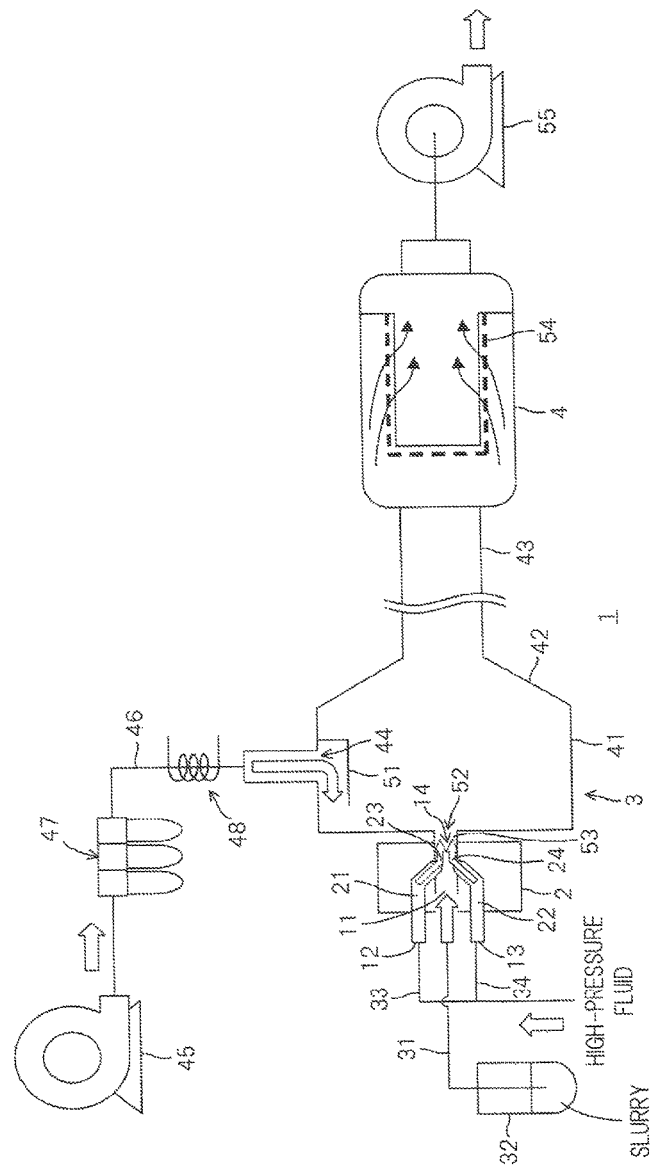
FIG. 1 is a cross-sectional view graphically illustrating a configuration of a coating apparatus according to a first embodiment of the present invention.

FIG. 1 is a cross-sectional view graphically illustrating a configuration of a coating apparatus 1 according to a first embodiment of the present invention.

The coating apparatus 1 is an apparatus that executes a coating process where fine particles that are a coating material is bonded to particles of a raw material powder to produce a composite powder (particles) in which a coating layer is formed on a surface of the composite powder. The coating apparatus 1 includes a dispersion mixing unit 2, a conveyance unit 3, and a collection unit 4. The dispersion mixing unit 2, the conveyance unit 3, and the collection unit 4 are arranged to be linearly aligned.

Figure 2:
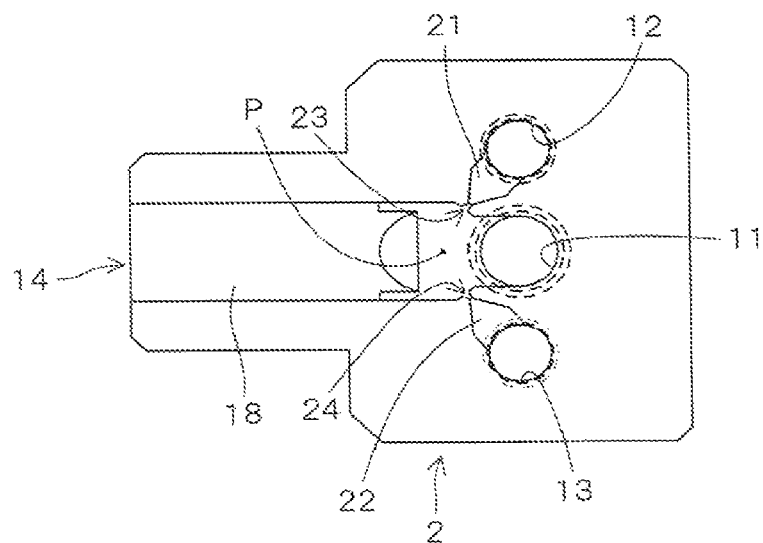
FIG. 2 is a top view of a dispersion mixing unit.
Figure 3:
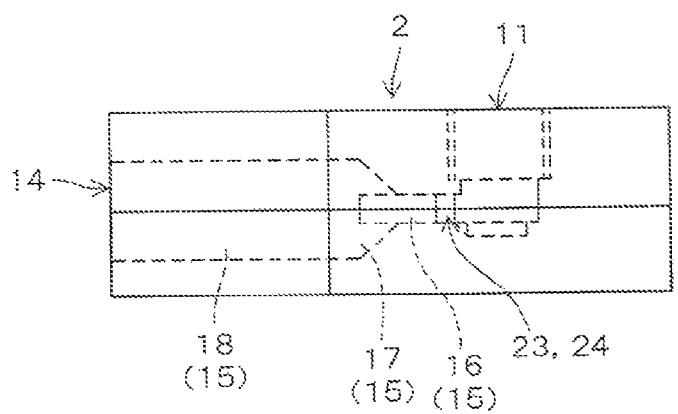
FIG. 3 is a side view of the dispersion mixing unit.

FIG. 2 is a top view of the dispersion mixing unit 2. FIG. 3 is a side view of the dispersion mixing unit 2. A configuration of the dispersion mixing unit 2 is described below based on the state where the dispersion mixing unit 2 is installed on a horizontal surface.

The dispersion mixing unit 2 has a cuboidal external shape. A slurry introduction port 11, a first gas flow introduction port 12, and a second gas flow introduction port 13 are formed on an upper surface of the dispersion mixing unit 2. The slurry introduction port 11, the first gas flow introduction port 12, and the second gas flow introduction port 13 are arranged in a straight line (hereinafter, the direction in which the slurry introduction port 11, the first gas flow introduction port 12, and the second gas flow introduction port 13 are arranged is referred to as "first horizontal direction"). The first gas flow introduction port 12 and the second gas flow introduction port 13 are located, respectively, on both sides of the slurry introduction port 11 in the first horizontal direction. A powder flow discharge port 14 is formed on one side surface of the dispersion mixing unit 2 extending in the first horizontal direction.

A slurry flow path 15 that allows the slurry introduction port 11 and the powder flow discharge port 14 to communicate with each other is formed inside the dispersion mixing unit 2. The slurry flow path 15 extends downward from the slurry introduction port 11, bends in a horizontal direction (hereinafter, this direction is referred to as "second horizontal direction") orthogonal to the first horizontal direction, and linearly extends toward the powder flow discharge port 14. A portion of the slurry flow path 15 that extends in the second horizontal direction includes a narrow path portion 16 having a relatively small up-down direction dimension, an expanding path portion 17 being continuous with the narrow path portion 16 and having an up-down direction dimension that increases toward the powder flow discharge port 14, and a wide path portion 18 being continuous with the expanding path portion 17 and having a relatively large up-down direction dimension. The wide path portion 18 is opened on the side surface of the dispersion mixing unit 2 and the opening of the wide path portion 18 is formed as the powder flow discharge port 14.

Moreover, a first flow path 21 communicating with the first gas flow introduction port 12 and a second flow path 22 communicating with the second gas flow introduction port 13 are formed inside the dispersion mixing unit 2.

The first flow path 21 extends downward from the first gas flow introduction port 12, bends in a horizontal direction, and extends toward the narrow path portion 16 of the slurry flow path 15. A first gas flow jet port 23 is formed on a side surface of the narrow path portion 16 and the first flow path 21 communicates with the first gas flow jet port 23. The first gas flow jet port 23 is formed as a slit-shaped opening whose opening length in the up-down direction is greater than the opening width in the horizontal direction, and the flow path cross section of the first flow path 21 becomes smaller toward the first gas flow jet port 23.

The second flow path 22 is formed symmetrically to the first flow path 21 with respect to a straight line passing the center of the slurry introduction port 11 and extending in the second horizontal direction. Specifically, the second flow path 22 extends downward from the second gas flow introduction port 13, bends in a horizontal direction, and extends toward the narrow path portion 16 of the slurry flow path 15. A second gas flow jet port 24 is formed on the side surface of the narrow path portion 16 and the second flow path 22 communicates with the second gas flow jet port 24. The second gas flow jet port 24 is formed as a slit-shaped opening whose opening length in the up-down direction is greater than the opening width in the horizontal direction, and the flow path cross section of the second flow path 22 becomes smaller toward the second gas flow jet port 24.

One end of a slurry supply pipe 31 is connected to the slurry introduction port 11. The other end of the slurry supply pipe 31 is connected to a slurry tank 32. A mixture of the raw material powder and a coating solution containing the coating material is stored in the slurry tank 32 in a slurry state.

The case where the coating apparatus 1 is used for production of a cathode active material powder for an all-solid battery is described below as an example.

The raw material powder is a lithium metal composite oxide and is formed of particles with an average particle size of about 2 to 30 µm. Metal elements forming the raw material powder include Co, Ni, Mn, Ti, Fe, Al, and the like but may include other elements to improve electrochemical properties. Specifically, particles of $LiCoO_2$, $LiNiO_2$, $LiMn_2O_4$, $LiNi_{1/3}Mn_{1/3}Co_{1/3}O_2$, $Li_4Ti_5O_{12}$, $LiFePO_4$, $LiNi_{0.8}Co_{0.15}Al_{0.05}O_2$, and the like can be given as the raw material powder.

The coating material is lithium niobate ($LiNbO_3$) and the coating solution is an alkoxide solution that is a precursor of lithium niobate. In the coating apparatus 1, the alkoxide solution is attached to the surfaces of the particles of the raw material powder and is dried to produce a powder in which the surface of the particles are coated with the precursor. Then, the precursor is burned at temperature of 250° C. or higher and lower than 500° C., and a composite powder that is the cathode active material powder coated with a thin film of lithium niobate can be thereby obtained.

The coating material is not limited to lithium niobate and may be any material with high lithium ion conductivity such as an insulating lithium composite oxide with similar effects, for example, lithium silicate, lithium borate, lithium titanate, lithium aluminate, lithium phosphate, or a composite compound of any of these substances.

In addition to ethoxides such as ethoxylithium, any of methoxides such as methoxylithium, propoxides and butoxides such as various types of propoxylithium and butoxylithium, and the like can be used as alkoxide. Moreover, an organic solvent can be used depending on purpose in addition to alcohols such as ethanol, methanol, various types of propanol, and butanol.

The coating solution desirably uses an organic solvent. However, using a precursor with high stability to water allows use of an aqueous solution or a mixed solvent of an organic solvent and an aqueous solution. In addition to a sol-gel method, various methods capable of forming an oxide thin film containing lithium can be used as a precursor synthesis method, for example, a method using a water-soluble metal complex such as a peroxo niobic acid complex, polyol synthesis such as glycol modification, a MOD (metal organic decomposition) method using an organic acid, gelation using polysaccharides, an LPD (liquid phase deposition method), a CSD (chemical solution deposition) method, and the like.

With reference to FIG. 1 again, for example, the slurry is supplied from the slurry tank 32 to the slurry introduction port 11 through the slurry supply pipe 31 by an action of a not-illustrated pump or ejector. The slurry introduced into the slurry flow path 15 from the slurry introduction port 11 flows toward the powder flow discharge port 14 through the slurry flow path 15.

Meanwhile, a high-pressure fluid is supplied to the first gas flow introduction port 12 and the second gas flow introduction port 13 through a first supply pipe 33 and a second supply pipe 34, respectively. Gas flows of the high-pressure fluid flow through the first flow path 21 and the second flow path 22 and are jetted into the narrow path portion 16 of the slurry flow path 15 from the first gas flow jet port 23 and the second gas flow jet port 24. The gas flows sprayed from the first gas flow jet port 23 and the second gas flow jet port 24 are accelerated such that the maximum speed thereof is faster than the speed of sound, that is the maximum Mach number thereof is 1 or more, and collide with each other at a collision position P set in the narrow path portion 16. When the slurry passes the collision position P, the slurry receives shear force from the gas flows colliding at the collision position P and flowing at speed exceeding the speed of sound. The slurry is thereby dispersed and turned into a powder in which the coating solution is attached to the surfaces of the particles. Note that any of inert gases such as nitrogen, carbon dioxide, and argon or atmospheric air in a high-pressure gas state is used as the high-pressure fluid. Moreover, the high-pressure fluid may be supplied in a supercritical state. The maximum speed of the jetted gas flows is preferably Mach 1 to 4 but may be lower than the speed of sound or higher than Mach 4.

The conveyance unit 3 includes a cylindrical portion 41 having a cylindrical peripheral surface, a circular truncated cone portion 42 being continuous with the cylindrical portion 41 and having a circular truncate cone shape that becomes narrower as it extends away from the cylindrical portion 41, and a pipe portion 43 extending from the circular truncated cone portion 42. The pipe portion 43 may be a straight pipe, a volute pipe, a cyclone pipe, or a combination of any of these pipes.

An assist air introduction port 44 is formed on the peripheral surface of the cylindrical portion 41. Assist air is supplied from an air supply source 45 to the assist air introduction port 44 through an assist air supply pipe 46. A blower, a pump, an air compressor, a compressed gas tank, and the like can be given as examples of the air supply source 45. A mist separator (dryer) 47 that removes moisture from the air sent from the air supply source 45 and a heater 48 that heats the air from which moisture is removed in the mist separator 47 are provided in a middle portion of the assist air supply pipe 46. Heated dry air is thereby introduced into the cylindrical portion 41 from the assist air introduction port 44 as the assist air. For example, the temperature of the heated dry air is set within a temperature range of 60° C. to 120° C. when the solvent of the coating solution is ethanol. Moreover, since setting the temperature above the boiling temperature of the solvent can promote drying, the temperature is preferably equal to or higher than the boiling point of ethanol which is 78° C. Note that, in addition to atmospheric air, any of various gases including, for example, inert gases such as nitrogen, carbon dioxide, and argon can be used as the assist air. The temperature of the heated air can be changed depending on the solvent and is preferably equal to or higher than the boiling point of the solvent. Note that the temperature is not limited to that in the aforementioned range and may be any temperature as long as an amount of heat necessary for drying can be supplied.

A gas flow control member 51 is provided on an inner surface of the cylindrical portion 41 to face the assist air introduction port 44. The assist air introduced into the cylindrical portion 41 from the assist air introduction port 44 becomes a vortex gas flow flowing along on the inner peripheral surface of the cylindrical portion 41 by a function of the gas flow control member 51 and passes the cylindrical portion 41, the circular truncated cone portion 42, and the pipe portion 43 in this order.

A powder introduction port 52 is formed on an end surface of the cylindrical portion 41. One end of a powder introduction path 53 is connected to the powder introduction port 52. The other end of the powder introduction path 53 is connected to the powder flow discharge port 14 of the dispersion mixing unit 2, and the powder flow discharge port 14 and the powder introduction port 52 communicate with each other via the powder introduction path 53.

The powder produced in the dispersion mixing unit 2 is discharged from the powder flow discharge port 14, flows through the powder introduction path 53, and is introduced into the cylindrical portion 41 of the conveyance unit 3 from the powder introduction port 52. Then, the powder introduced into the cylindrical portion 41 is carried by a gas flow of the assist air formed in the cylindrical portion 41 to be conveyed toward the pipe portion 43 though the conveyance unit 3. In the conveyance, the coating solution attached to the surfaces of the particles is dried and a powder in which the surfaces of the particles are coated with the precursor of the coating material is thereby produced. A heater or the like may heat the conveyance unit 3 to promote drying.

The pipe portion 43 of the conveyance unit 3 is connected to the collection unit 4 and the inside of the conveyance unit 3 and the inside of the collection unit 4 communicate with each other. The gas flow (powder flow) flowing through the conveyance unit 3 and carrying the powder is introduced into the collection unit 4. A bag filter 54 is provided in the collection unit 4. The powder flow introduced into the collection unit 4 passes the bag filter 54. The bag filter 54 thereby captures the powder and only the gas flow from which the powder is removed passes the bag filter 54.

A powder collection method of the collection unit 4 is not limited to a method using the bag filter 54 and may be a method using a cyclone or a method using the bag filter 54 and the cyclone. Moreover, the configuration may be such that a blower 55 is connected to the collection unit 4 and discharge of the gas flow from the collection unit 4 is assisted by a function of the blower 55.

<Operations and Effects>

As described above, in the dispersion mixing unit 2, the slurry (mixture) obtained by mixing the raw material powder and the coating solution is dispersed by the gas flow of the high-pressure fluid and is turned into the powder in which the film of the coating solution is attached to the surfaces. Accordingly, it is possible to suppress agglomeration of the raw material powder and improve the dispersibility. The coating process on the powder can be thus performed in a continuous process. Moreover, since the dispersion mixing unit 2 includes no spray nozzle that jets out the coating solution, there is no collection loss caused by attachment of the powder around the spray nozzle and the efficiency of the coating process (powder collection efficiency) can be improved.

Moreover, supplying the raw material powder and the coating solution in the slurry state to the dispersion mixing unit 2 can improve the attachment ratio of the coating material to the particles that are the main raw material.

The dispersion mixing unit 2 includes the slurry flow path 15 through which the slurry flows and the first gas flow jet port 23 and the second gas flow jet port 24 that each blow out the gas flow of the high-pressure fluid toward the collision position P set in the slurry flow path 15. When the slurry flowing through the slurry flow path 15 passes the collision position P, the slurry receives the shear force from the gas flows colliding at the collision position P and can be thereby preferably dispersed and turned into the powder.

The assist air introduction port 44 that introduces the assist gas being the heated dry gas is formed in the conveyance unit 3. Supplying the assist gas to the conveyance unit 3 allows the powder to be preferably conveyed toward the collection unit 4 and also promotes drying of the coating solution in the conveyance unit 3.

The assist gas introduced into the conveyance unit 3 from the assist air introduction port 44 is introduced to flow along the inner peripheral surface of the conveyance unit 3. This can suppress attachment of the powder to the inner peripheral surface of the conveyance unit 3 and further improve the powder collection efficiency.

Moreover, the dispersion mixing unit 2, the conveyance unit 3, and the collection unit 4 are arranged to be linearly aligned. Accordingly, it is possible to promptly convey the powder and increase the speed of the coating process.

Second Embodiment

Figure 4:
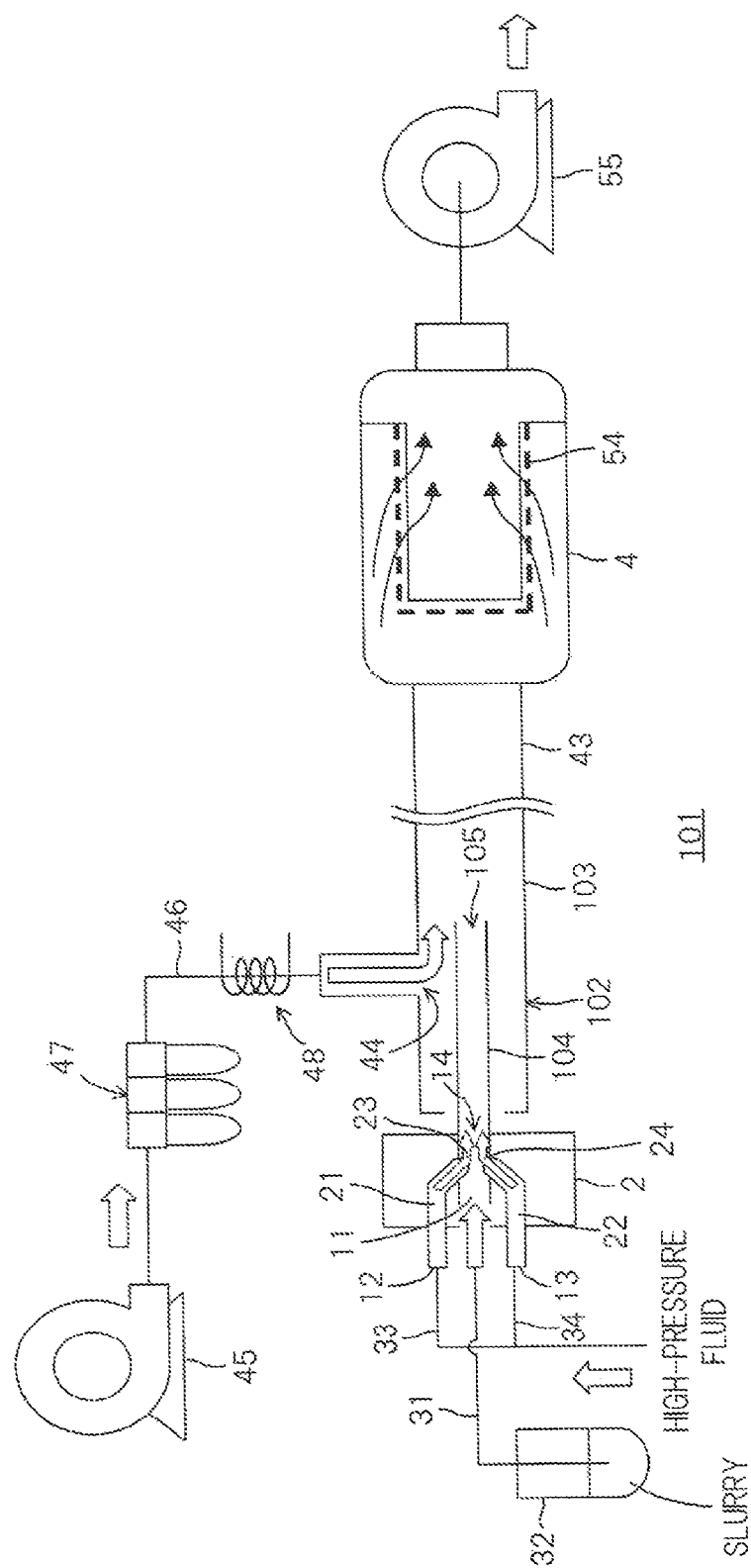
FIG. 4 is a cross-sectional view graphically illustrating a configuration of a coating apparatus according to a second embodiment of the present invention.

FIG. 4 is a cross-sectional view graphically illustrating a configuration of a coating apparatus 101 according to a second embodiment of the present invention. In FIG. 4, portions corresponding to the portions illustrated in FIG. 1 are denoted by the same reference numerals as those of the portions in FIG. 1. Moreover, description of the portions denoted by the same reference numerals is omitted below.

In the coating apparatus 101, a configuration of a conveyance unit 102 is different from the configuration of the conveyance unit 3 in the coating apparatus 1. The conveyance unit 102 includes a cylindrical main body 103 and a tubular powder introduction path 104 inserted in one end portion of the main body 103. One end of the powder introduction path 104 is opened in the main body 103 as a powder introduction port 105. The other end of the powder introduction path 104 is connected to the powder flow discharge port 14 of the dispersion mixing unit 2 and the powder flow discharge port 14 and the powder introduction port 105 communicate with each other through the powder introduction path 104.

Moreover, in the conveyance unit 102, the assist air introduction port 44 faces a tube wall of the powder introduction path 104 in a radial direction of the main body 103 (direction orthogonal to a center line direction).

This configuration can suppress collision between the flow of the powder introduced from the dispersion mixing unit 2 to the conveyance unit 102 (main body 103) through the powder introduction path 104 and the assist air introduced into the conveyance unit 102 from the assist air introduction port 44 in directions orthogonal to each other and suppress generation of turbulence in the conveyance unit 102. As a result, it is possible to suppress attachment of the powder around the assist air introduction port 44 on an inner surface of the conveyance unit 102 and further improve the powder collection efficiency.

Moreover, the configuration of the coating apparatus 101 can provide operations and effects similar to those of the configuration of the coating apparatus 1 illustrated in FIG. 1.

Third Embodiment

Figure 5:
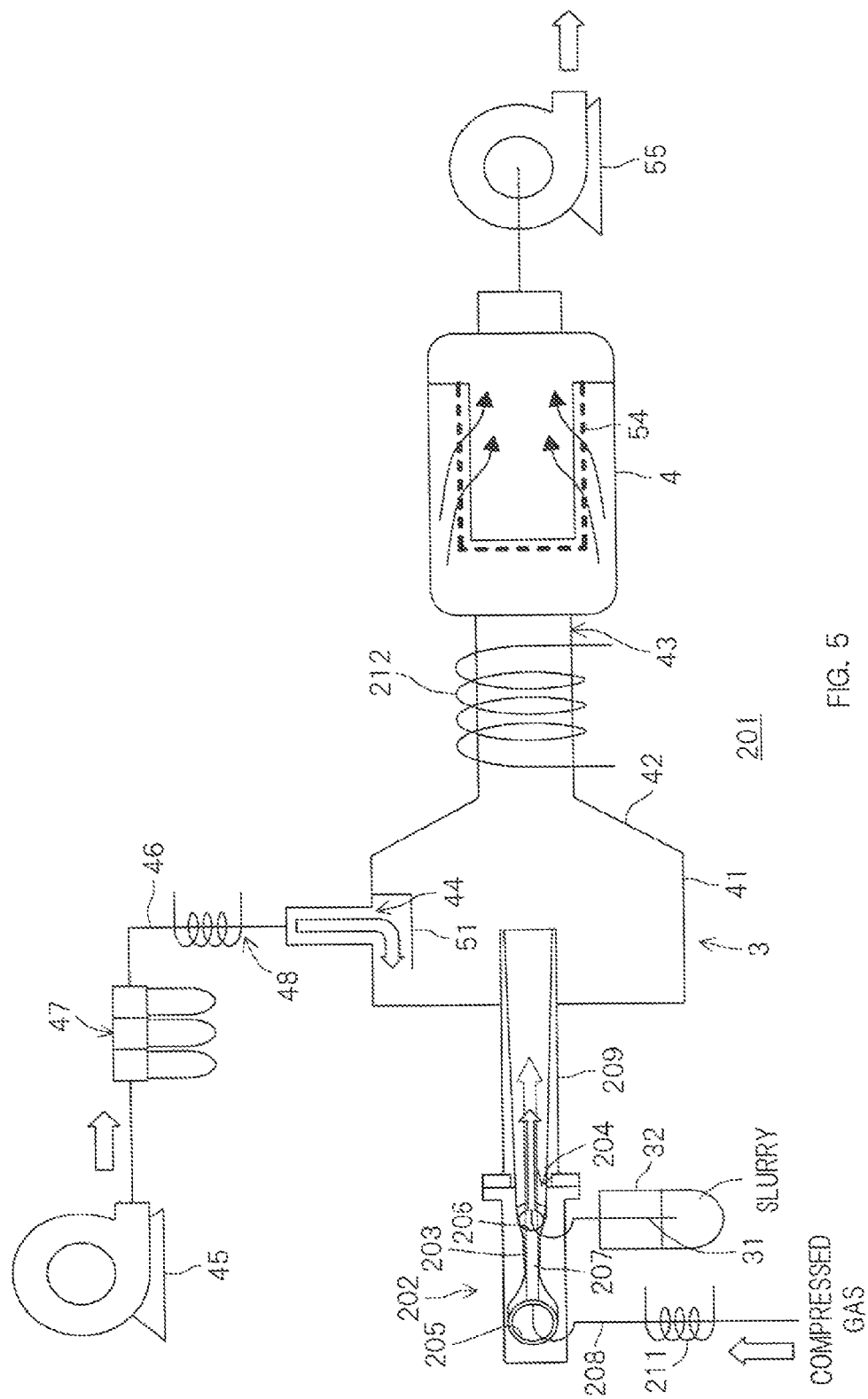
FIG. 5 is a cross-sectional view graphically illustrating a configuration of a coating apparatus according to a third embodiment of the present invention.

FIG. 5 is a cross-sectional view graphically illustrating a configuration of a coating apparatus 201 according to a third embodiment of the present invention. In FIG. 5, portions corresponding to the portions illustrated in FIG. 1 are denoted by the same reference numerals as those of the portions in FIG. 1. Moreover, description of the portions denoted by the same reference numerals is omitted below.

The coating apparatus 201 employs a dispersion mixing unit 202 instead of the dispersion mixing unit 2.

Figure 6:
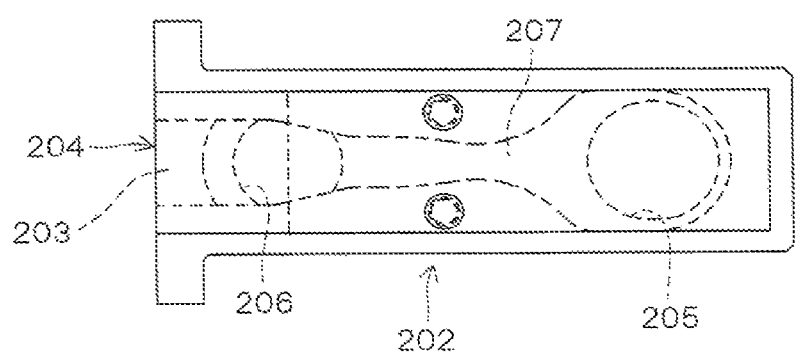
FIG. 6 is a bottom view of a dispersion mixing unit illustrated in FIG. 5.

FIG. 6 is a bottom view of the dispersion mixing unit 202.

The dispersion mixing unit 202 is formed to be short in the first horizontal direction and long in the second horizontal direction. A flow path 203 extending in the second horizontal direction is formed in the dispersion mixing unit 202. One end of the flow path 203 is opened on a side surface of the dispersion mixing unit 202 extending in the first horizontal direction, as a powder flow discharge port 204. Moreover, a gas flow introduction port 205 that supplies the gas flow of the high-pressure fluid into the flow path 203 and a slurry introduction port 206 that is provided downstream of the gas flow introduction port 205 in the flow direction of the gas flow and that introduces the slurry into the flow path 203 are formed on an upper surface of the dispersion mixing unit 202. Moreover, the flow path cross section of the flow path 203 is reduced and increased in a middle portion of the flow path 203 between the gas flow introduction port 205 and the slurry introduction port 206 to form a de Laval nozzle 207.

As illustrated in FIG. 5, the slurry supply pipe 31 extending from the slurry tank 32 is connected to the slurry introduction port 206. The slurry supplied from the slurry tank 32 to the slurry introduction port 206 through the slurry supply pipe 31 is introduced into the flow path 203 from the slurry introduction port 206 and flows toward the powder flow discharge port 204 through the flow path 203. Meanwhile, a supply pipe 208 is connected to the gas flow introduction port 205 and a compressed gas (inert gas such as nitrogen, carbon dioxide, or argon or atmospheric air in a high-pressure gas state) that is an example of the high-pressure fluid is supplied through the supply pipe 208. When the compressed gas passes the de Laval nozzle 207, the flow rate of the compressed gas greatly increases and reaches, for example, three times the speed of sound. The gas flow flowing at the flow rate exceeding the speed of sound flows while passing the slurry introduced into the flow path 203. The slurry thereby receives shear force from the gas flow and is dispersed and turned into the powder in which the coating solution is attached to the surfaces of the particles.

One end of a powder introduction path 209 is connected to the powder flow discharge port 204. The powder introduction path 209 penetrates an end surface of the cylindrical portion 41 of the conveyance unit 3 and the other end portion of the powder introduction path 209 is arranged in the cylindrical portion 41. The powder introduction path 209 is formed such that the flow path cross section thereof gradually increases from the one end side toward the other end side (conveyance unit 3 side). A heater may heat the powder introduction path 209 to promote drying of the powder. A heater 211 may heat the compressed gas supplied to the dispersion mixing unit 202 for the same reason. In this case, the temperature of the compressed gas is preferably set to the same temperature as the heated dry air. Moreover, the temperature of the compressed gas is preferably set higher than the boiling point of the solvent of the coating solution. The powder produced in the dispersion mixing unit 202 is discharged from the powder flow discharge port 204, flows through the powder introduction path 209, and is introduced into the cylindrical portion 41 of the conveyance unit 3. Then, the powder introduced into the cylindrical portion 41 is carried by the gas flow of the assist air formed in the cylindrical portion 41 to be conveyed toward the pipe portion 43 through the conveyance unit 3. In the conveyance, the coating solution attached to the surfaces of the particles is dried and the powder in which the surfaces of the particles are coated with the precursor is thereby produced. A heater 212 may heat the pipe portion 43 of the conveyance unit 3 to promote drying of the powder.

The configuration of the coating apparatus 201 illustrated in FIG. 5 can also provide operations and effects similar to those of the configuration of the coating apparatus 1 illustrated in FIG. 1.

Moreover, heating the compressed gas with the heater 211 can suppress a temperature drop due to adiabatic expansion that occurs in the jetting of the compressed gas and enables efficient drying without a decrease in drying speed.

<Classifier>

Figure 7:
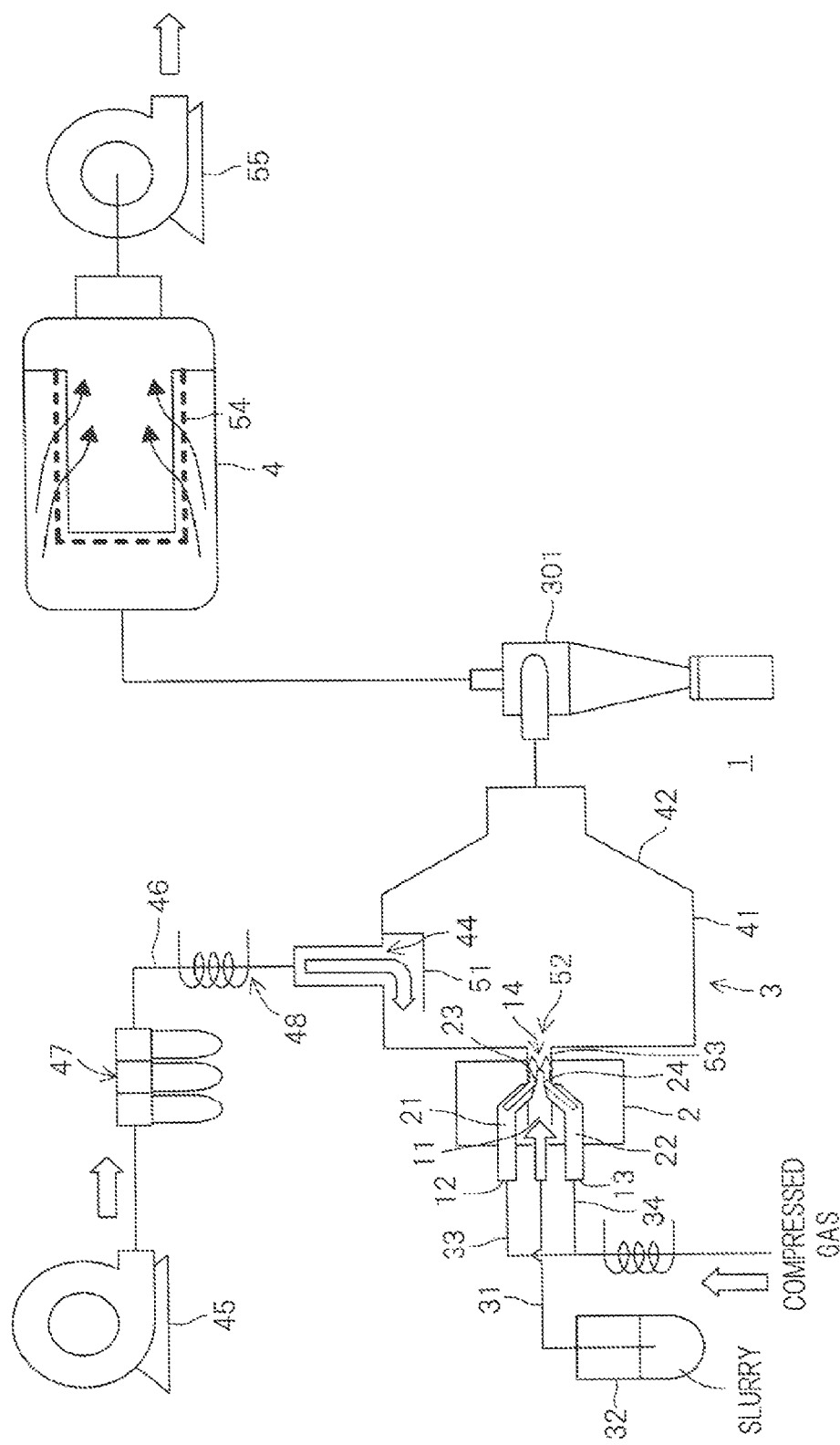
FIG. 7 is a cross-sectional view graphically illustrating a configuration of the coating apparatus employing a classification unit.

FIG. 7 is a cross-sectional view graphically illustrating a configuration of the coating apparatus 1 employing a classification unit 301. In FIG. 7, portions corresponding to the portions illustrated in FIG. 1 are denoted by the same reference numerals as those of the portions in FIG. 1. Moreover, description of the portions denoted by the same reference numerals is omitted below.

The aforementioned coating apparatus 1 may employ the classification unit 301 to selectively collect the composite powder in which the coating layer is formed on the surface. The classification unit 301 is formed of a classifier and is provided between the conveyance unit 3 and the collection unit 4. The gas flow (powder flow) flowing through the conveyance unit 3 and carrying the powder is introduced into the classification unit 301. Then, the classification unit 301 collects the composite powder with a relatively large particle size, and a powder with a relatively small particles size such as, for example, the precursor of the coating material that has not turned into a composite passes the classification unit 301 and flows into the collection unit 4 to be collected in the collection unit 4.

Although a cyclone is illustrated as the classification unit 301 in FIG. 7, which type of classifier is to be employed in the classification unit 301 may be determined as appropriate depending on the specific gravity and particle size of the powder to be collected in the classification unit 301. Moreover, multiple classification units may be provided to perform multi-stage separation and the powder can be separated into multiple classes depending on the level of the particle size. For example, unnecessary coarse particles such as agglomerated powder can be separated in advance. Moreover, not only the coating apparatus 1 but also the aforementioned coating apparatuses 101 and 201 may employ the classifier as a matter of course.

Fourth Embodiment

Figure 8:
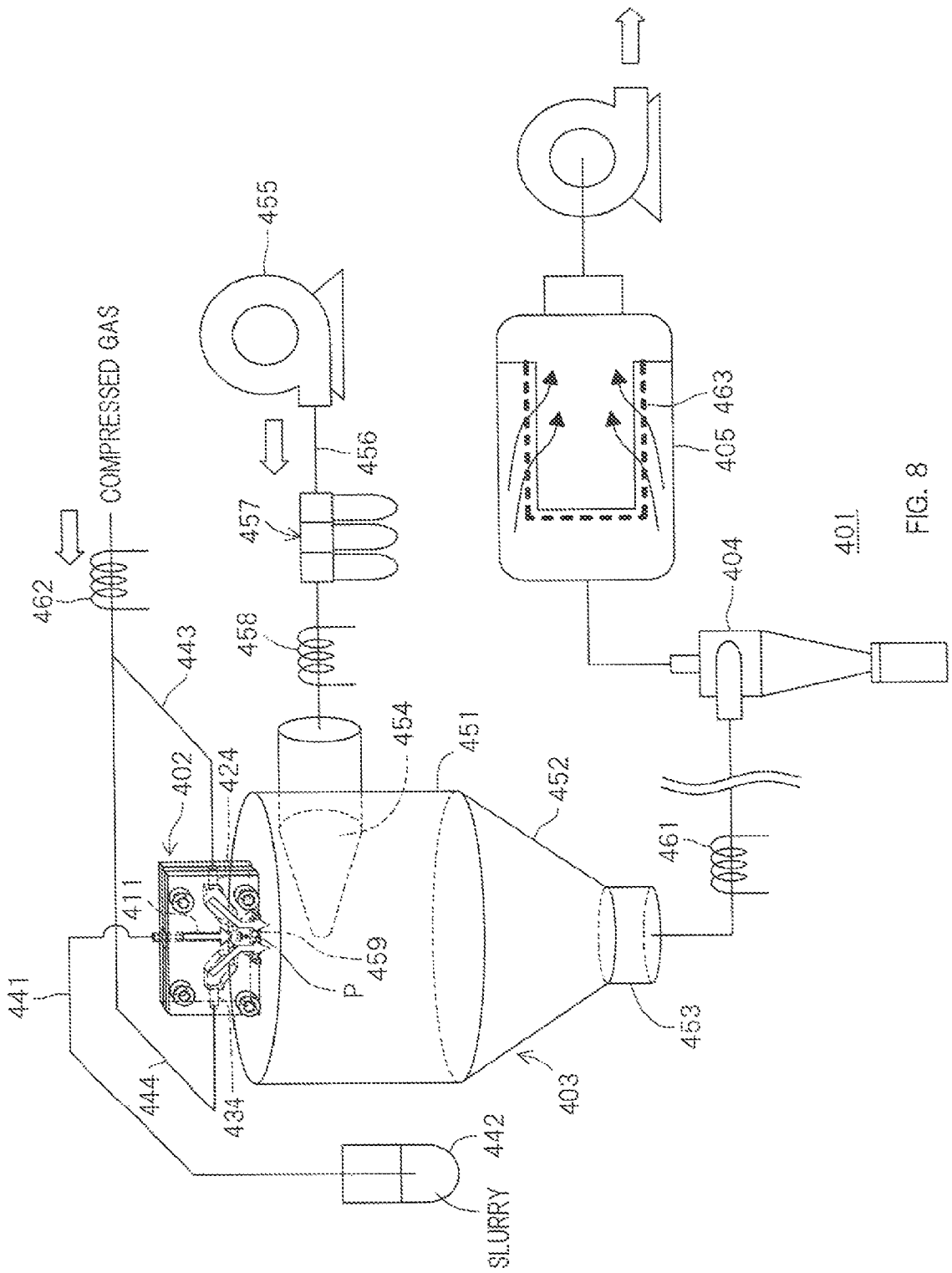
FIG. 8 is a cross-sectional view graphically illustrating a configuration of a coating apparatus according to a fourth embodiment of the present invention.

FIG. 8 is a cross-sectional view graphically illustrating a configuration of a coating apparatus 401 according to a fourth embodiment of the present invention.

The coating apparatus 401 includes a dispersion mixing unit 402, a conveyance unit 403, a classification unit 404, and a collection unit 405.

Figure 9:
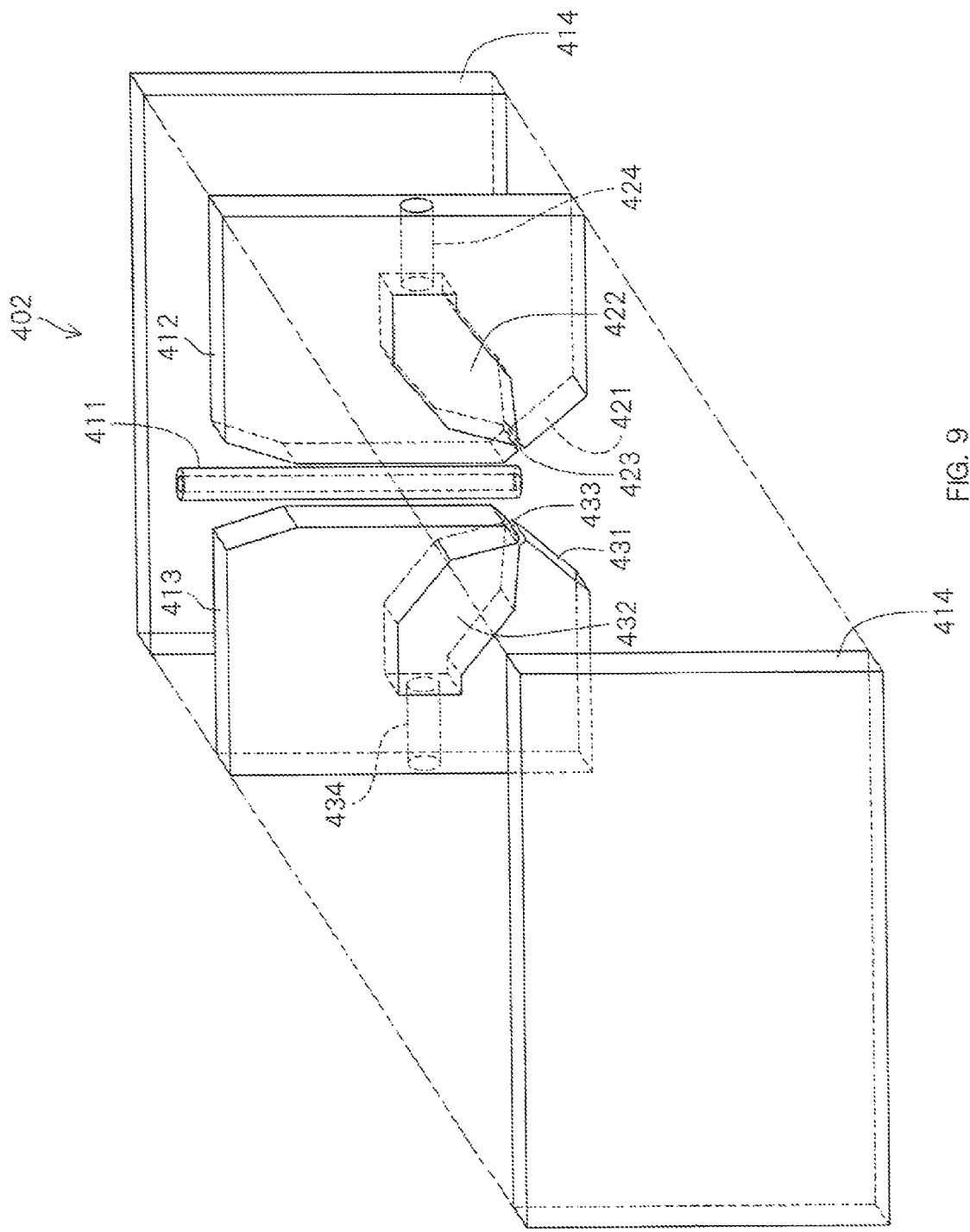
FIG. 9 is an exploded perspective view of a dispersion mixing unit illustrated in FIG. 8.

FIG. 9 is an exploded perspective view of the dispersion mixing unit 402.

The dispersion mixing unit 402 has a configuration in which a slurry flow pipe 411, a first gas flow jet body 412, and a second gas flow jet body 413 are sandwiched between two rectangular-plate-shaped sandwich plates 414.

The slurry flow pipe 411 is formed of a circular pipe extending in a straight shape and the coating solution in the slurry state is discharged from a front end opening of the slurry flow pipe 411. The slurry flow pipe 411 is movable relative to the first gas flow jet body 412 and the second gas flow jet body 413 in a longitudinal direction. Note that the front end opening of the slurry flow pipe does not have to have a straight pipe shape and may be formed in, for example, a substantially conical shape whose diameter decreases toward the front end opening. A chamfered portion, a curved surface, or an edge may be formed as appropriate in an opening portion.

The first gas flow jet body 412 and the second gas flow jet body 413 are arranged at positions 180° symmetric to each other with respect to the center line of the slurry flow pipe 411.

The first gas flow jet body 412 is formed in such a shape that two corner portions of the rectangular plate shape on the slurry flow pipe 411 side are cut away in triangular shapes, and has a tilted surface 421, tilted to extend away from the slurry flow pipe 411 toward the lower side, in a lower portion of an end surface on the slurry flow pipe 411 side. Moreover, a pressure increasing chamber 422 is formed in the first gas flow jet body 412 to penetrate the first gas flow jet body 412 in a thickness direction. The pressure increasing chamber 422 extends, from a middle portion of the first gas flow jet body 412 in an opposing direction to the slurry flow pipe 411, toward the slurry flow pipe 411, bends obliquely downward, tilts downward as it extends toward the slurry flow pipe 411, and extends toward the tilted surface 421. A slit-shaped first gas flow jet port 423 extending in the thickness direction is formed on the tilted surface 421 and the pressure increasing chamber 422 decreases in the cross-sectional area toward the tilted surface 421 and is connected to the first gas flow jet port 423. Moreover, a first gas flow introduction path 424 is formed in the first gas flow jet body 412. One end of the first gas flow introduction path 424 is connected to the pressure increasing chamber 422 and the other end of the first gas flow introduction path 424 is opened on an end surface of the first gas flow jet body 412 on the opposite side to the slurry flow pipe 411.

The second gas flow jet body 413 is formed symmetrically to the first gas flow jet body 412 with respect to the center line of the slurry flow pipe 411. Specifically, the second gas flow jet body 413 is formed in such a shape that two corner portions of the rectangular plate shape on the slurry flow pipe 411 side are cut away in triangular shapes, and has a tilted surface 431, tilted to extend away from the slurry flow pipe 411 toward the lower side, in a lower portion of an end surface on the slurry flow pipe 411 side. Moreover, a pressure increasing chamber 432 is formed in the second gas flow jet body 413 to penetrate the second gas flow jet body 413 in a thickness direction. The pressure increasing chamber 432 extends, from a middle portion of the second gas flow jet body 413 in an opposing direction to the slurry flow pipe 411, toward the slurry flow pipe 411, bends obliquely downward, tilts downward as it extends toward the slurry flow pipe 411, and extends toward the tilted surface 431. A slit-shaped second gas flow jet port 433 extending in the thickness direction is formed on the tilted surface 431 and the pressure increasing chamber 432 decreases in the cross-sectional area toward the tilted surface 431 and is connected to the second gas flow jet port 433. Moreover, a second gas flow introduction path 434 is formed in the second gas flow jet body 413. One end of the second gas flow introduction path 434 is connected to the pressure increasing chamber 432 and the other end of the second gas flow introduction path 434 is opened on an end surface of the second gas flow jet body 413 on the opposite side to the slurry flow pipe 411.

The two sandwich plates 414 sandwich the slurry flow pipe 411, the first gas flow jet body 412, and the second gas flow jet body 413 in a group. Both ends of the pressure increasing chamber 422 of the first gas flow jet body 412 in the thickness direction are closed by the sandwich plates 414, respectively. Similarly, both ends of the pressure increasing chamber 432 of the second gas flow jet body 413 in the thickness direction are closed by the sandwich plates 414, respectively.

As illustrated in FIG. 8, one end of a slurry supply pipe 441 is connected to an upper end of the slurry flow pipe 411. The other end of the slurry supply pipe 441 is connected to a slurry tank 442. The mixture of the raw material powder and the coating solution containing the coating material is stored in the slurry tank 442 in a slurry state.

For example, the slurry is supplied from the slurry tank 442 to the slurry flow pipe 411 through the slurry supply pipe 441 by an action of a pump or an ejector. The slurry supplied to the slurry flow pipe 411 flows through the slurry flow pipe 411 and is discharged downward from a lower end of the slurry flow pipe 411.

Meanwhile, a compressed gas (inert gas such as nitrogen, carbon dioxide, or argon or atmospheric air in a high-pressure gas state) that is an example of the high-pressure fluid is supplied to the first gas flow introduction path 424 and the second gas flow introduction path 434 through a first supply pipe 443 and a second supply pipe 444, respectively. The compressed gas flows through the first gas flow introduction path 424 and the second gas flow introduction path 434 and flows into the pressure increasing chambers 422 and 432 from the first gas flow introduction path 424 and the second gas flow introduction path 434, respectively. The air pressure in the pressure increasing chambers 422 and 432 thereby increases and gas flows are strongly jetted out from the first gas flow jet port 423 and the second gas flow jet port 433. The gas flows jetted out from the first gas flow jet port 423 and the second gas flow jet port 433 collide with each other at a collision position P below the slurry flow pipe 411. The slurry discharged from the lower end of the slurry flow pipe 411 receives shear force from the gas flows colliding at the collision position P while passing the collision position P and is dispersed and turned into the powder in which the coating solution is attached to the surfaces of the particles. Note that, in this case, the discharge position of the slurry supply pipe 411 can be adjusted in the up-down direction and be finely adjusted to a position optimal for the dispersion relative to the collision position P.

The conveyance unit 403 integrally includes a cylindrical portion 451 having a cylindrical peripheral surface, a circular truncated cone portion 452 being continuous with the cylindrical portion 451 and having a circular truncate cone shape that becomes narrower as it extends away from the cylindrical portion 451, and a pipe portion 453 extending from the circular truncated cone portion 452. The pipe portion 453 may be a straight pipe, a volute pipe, or a cyclone pipe. The conveyance unit 403 is arranged directly below the dispersion mixing unit 402 such that the center line of the cylindrical portion 451 extends in the up-down direction.

An assist air introduction port 454 is formed on a peripheral surface of the cylindrical portion 451. The assist air is supplied from an air supply source 455 to the assist air introduction port 454 through an assist air supply pipe 456. For example, a blower, a pump, an air compressor, a compressed gas tank, and the like can be given as the air supply source 455. A mist separator (dryer) 457 that removes moisture from the air from the air supply source 455 and a heater 458 that heats the air from which moisture is removed in the mist separator 457 are provided in a middle portion of the assist air supply pipe 456. The heated dry air is thereby introduced into the cylindrical portion 451 from the assist air introduction port 454 as the assist air. Note that, in addition to atmospheric air, any of various gases including, for example, inert gases such as nitrogen, carbon dioxide, and argon can be used as the assist air.

The assist air introduction port 454 and the assist air supply pipe 456 are formed such that the assist air is blown out from the assist air introduction port 454 in a tangent direction of the inner peripheral surface of the cylindrical portion 451. Accordingly, the assist air introduced into the cylindrical portion 451 from the assist air introduction port 454 becomes a vortex gas flow flowing along the inner peripheral surface of the cylindrical portion 451 and passes the cylindrical portion 451, the circular truncated cone portion 452, and the pipe portion 453 in this order.

A powder introduction port 459 is formed on an upper surface of the cylindrical portion 451. The powder produced in the dispersion mixing unit 402 is introduced into the cylindrical portion 451 of the conveyance unit 403 through the powder introduction port 459. Then, the powder introduced into the cylindrical portion 451 is carried by the assist air formed in the cylindrical portion 451 to be conveyed toward the pipe portion 453 through the conveyance unit 403. In this conveyance, the coating solution attached to the surfaces of the particles is dried and the powder in which the surfaces of the particles are coated with the precursor of the coating material is thereby produced. A heater 461 may heat the conveyance unit 403 to promote drying of the powder. A heater 462 may heat the compressed gas supplied to the first gas flow introduction path 424 and the second gas flow introduction path 434 of the dispersion mixing unit 402 due to the same reason.

The classification unit 404 is formed of a classifier and is provided between the conveyance unit 403 and the collection unit 405. The gas flow (powder flow) flowing through the conveyance unit 403 and carrying the powder is introduced into the classification unit 404. Then, the classification unit 404 collects the composite powder with a relatively large particle size, and a powder with a relatively small particles size such as, for example, the precursor of the coating material containing no raw material powder passes the classification unit 404 and flows into the collection unit 405.

A bag filter 463 is provided in the collection unit 405. The bag filter 463 collects the powder flowing into the collection unit 405 and only the gas flow from which the powder is removed passes the bag filter 463.

The configuration of the coating apparatus 401 illustrated in FIG. 8 can also provide operations and effects similar to those of the configuration of the coating apparatus 1 illustrated in FIG. 1.

Figure 10:
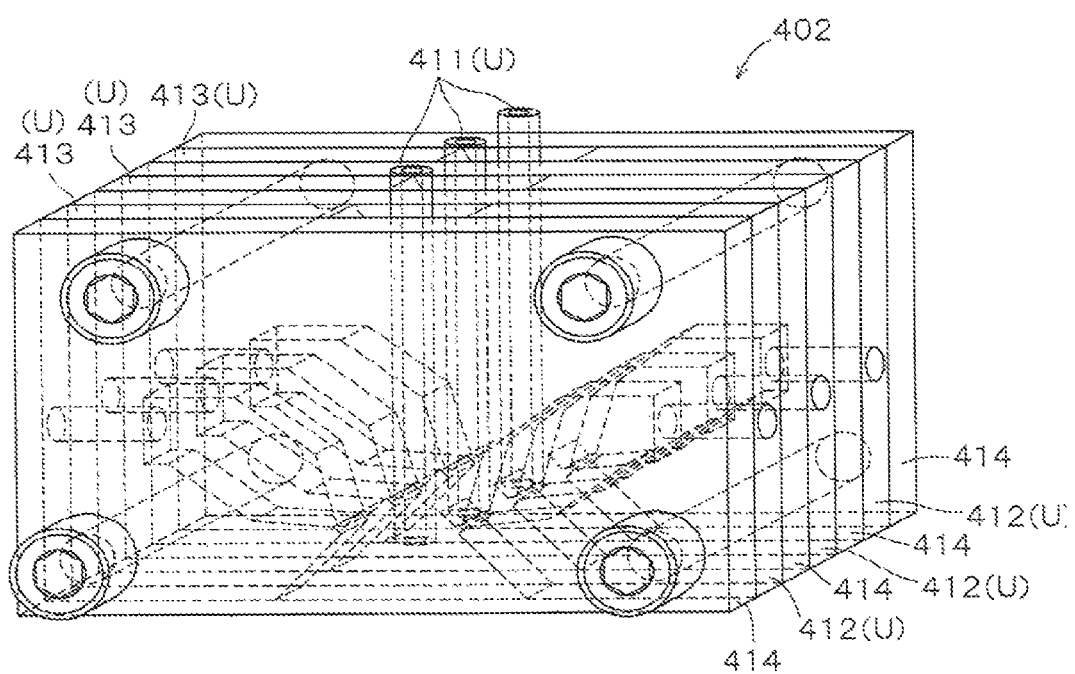
FIG. 10 is a perspective view illustrating a modified example of the dispersion mixing unit.

Moreover, in the configuration of the coating apparatus 401, the flow rate of the powder flow supplied from the dispersion mixing unit 402 to the conveyance unit 403 can be easily increased or reduced. Specifically, as illustrated in FIG. 10, units U (modules) each including the slurry flow pipe 411, the first gas flow jet body 412, and the second gas flow jet body 413 and the sandwich plates 414 can be alternately stacked one on top of another. Increasing or reducing the stack number can increase or reduce a unit number that is the number of units U included in the dispersion mixing unit 402, and the flow amount of the powder flow supplied from the dispersion mixing unit 402 to the conveyance unit 403 can be increased or reduced depending on the unit number. The sandwich plates 414 are provided at both ends of a laminate of the units U and the sandwich plates 414.

Note that, as illustrated in FIG. 11, the sum of the flow amounts of the gas flows jetted out from the first gas flow jet port 423 and the second gas flow jet port 433 (total jetting amount) is preferably increased or reduced in proportion to the unit number. Moreover, the flow amount of the assist air (assist air amount) is preferably increased or reduced in proportion to the unit number. In this case, the flow amount of air (air amount) in the cylindrical portion 451 of the conveyance unit 403 increases or decreases in proportion to the unit number.

Figure 12:
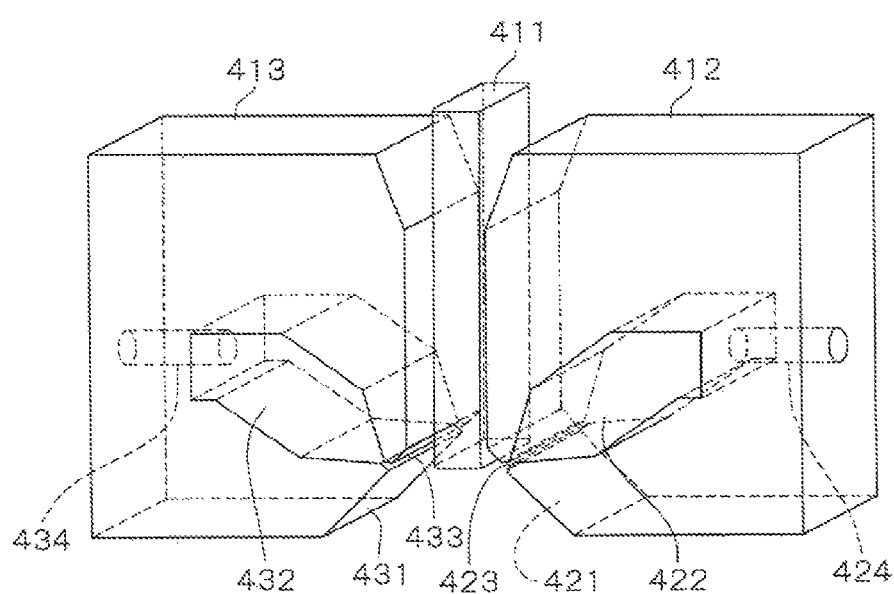
FIG. 12 is a perspective view illustrating another modified example of the dispersion mixing unit.
Figure 13:
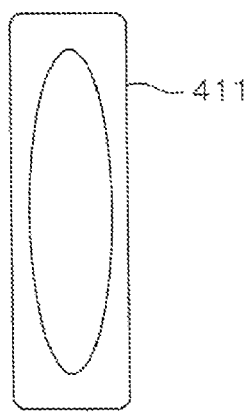
FIG. 13 is a view illustrating an example of a cross-sectional shape of a slurry flow pipe in the dispersion mixing unit illustrated in FIG. 12.
Figure 14:
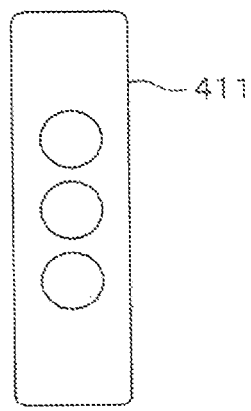
FIG. 14 is a view illustrating another example of the cross-sectional shape of the slurry flow pipe in the dispersion mixing unit illustrated in FIG. 12.

Moreover, as illustrated in FIG. 12, even when the dispersion mixing unit 402 includes one unit U, the flow amount of the powder flow supplied from the dispersion mixing unit 402 to the conveyance unit 403 can be increased by increasing the thickness of the unit U (the slurry flow pipe 411, the first gas flow jet body 412, and the second gas flow jet body 413). In this case, the slurry flow pipe 411 may be formed such that a pipe path thereof has an ellipsoidal cross-sectional shape as illustrated in FIG. 13 or such that multiple pipe paths with a circular cross section are formed as illustrated in FIG. 14 to achieve even dispersibility of the powder.

MODIFIED EXAMPLES

Although several embodiments of the present invention are described above, the present invention can be carried out in other modes.

For example, the dispersion mixing unit 2 may be configured such that the slurry introduction port 11 is formed on a side surface and the slurry flow path 15 that allows the slurry introduction port 11 and the powder flow discharge port 14 to communicate with each other linearly extends. The slurry flow pipe 411 does not have to have a tubular shape and a flow path may be formed integrally with the other members of the dispersion mixing unit 2.

Moreover, the present invention is not limited to application to production of the cathode active material powder for an all-solid battery and may be applied to manufacturing processes of foods, pharmaceutical products, cosmetics, electronic parts, and the like. Similarly, the particles to be produced are not limited to those used in a battery material and the average particle size may be outside the range of 2 to 30 μm.

Furthermore, various design changes can be made on the aforementioned configurations within the scope of matters described in the claims.

REFERENCE SIGNS LIST

1, 101, 201, 401: coating apparatus
2, 202, 402: dispersion mixing unit (dispersion unit, powder dispersion device)
3, 102: conveyance unit
4, 404: collection unit
11, 206: slurry introduction port
12: first gas flow introduction port
13: second gas flow introduction port
14: powder flow discharge port
15: slurry flow path (flow path)
23, 423: first gas flow jet port (first jet port)
24, 433: second gas flow jet port (second jet port)
44, 454: assist air introduction port (gas introduction unit)
104: powder introduction path
111: flow path
113: gas flow introduction port
114: slurry introduction port (mixture introduction port)
411: slurry flow pipe (flow path)
P: collision position

What is claimed is:

1. A coating method of a powder comprising:
dispersing a mixture of a raw material powder and a coating solution containing a coating material by using a gas flow of compressed gas while causing a film of the coating solution to attach to a surface of the raw material powder;
conveying the raw material powder to which the film of the coating solution is attached by causing a gas flow to carry the raw material powder and drying the coating solution during the conveyance; and
collecting a composite powder produced by drying the coating solution,
wherein the compressed gas is pre-heated to a predetermined temperature to promote drying of the coating solution.

2. The coating method of a powder according to claim 1, wherein the mixture is in a slurry state.

3. The coating method of a powder according to claim 1, wherein:
the dispersing the mixture includes flowing the mixture through a flow path, and blowing out the gas flow of the compressed gas toward a collision position using a first jet port and a second jet port, and
when the mixture flowing through the flow path passes the collision position, the mixture receives shear force from the gas flows colliding at the collision position and is dispersed.

4. The coating method of a powder according to claim 3, wherein:
the flow path, the first jet port, and the second jet port are formed such that center lines of a flow of the mixture toward the collision position and the gas flows from the first jet port and the second jet port are located on the same plane, and
a plurality of units including the flow paths, the first jet port and the second jet port are aligned in a direction orthogonal to the center lines.

5. The coating method of a powder according to claim 1, wherein:
the dispersing the mixture comprises introducing via a gas flow introduction port the gas flow of the compressed gas into a flow path, and introducing the mixture into the flow path via a mixture introduction port downstream of the gas flow introduction port in a flow direction of the gas flow, and
the mixture is dispersed by receiving shear force from the gas flow in the flow path.

6. The coating method of a powder according to claim 5, wherein the flow path has a de Laval nozzle form, and
the flow path cross section of the flow path is reduced and increased in a portion of the flow path between the gas flow introduction port and the mixture introduction port to form the de Laval nozzle form.

7. The coating method of a powder according to claim 1, further comprising introducing a heated dry gas during the conveyance using a gas introduction unit.

8. The coating method of a powder according to claim 7, wherein:
the conveyance is accomplished using a conveyance unit having a cylindrical inner peripheral surface, and
the gas introduction unit introduces the heated dry gas into the conveyance unit such that the heated dry gas flows along the inner peripheral surface.

9. The coating method of a powder according to claim 7, wherein:

the conveyance is accomplished using a conveyance unit including an introduction path that introduces the powder from a dispersion unit, and the gas introduction unit introduces the heated dry gas into the conveyance unit from a position facing a pipe wall forming the introduction path.

10. The coating method of a powder according to claim 1, wherein the dispersion, the conveyance, and the collection are accomplished linearly.

11. The coating method of a powder according to claim 1, wherein the raw material powder is an electrode active material of a battery.

12. The coating method of a powder according to claim 1, wherein the dispersion causes the mixture to flow in an up-down direction.

13. The coating method of a powder according to claim 1, wherein the predetermined temperature to which the compressed gas is pre-heated is above the boiling point of a solvent of the coating solution.

* * * * *